June 27, 1939.    G. H. HUNT    2,163,686
BRAKE BOOSTER
Filed Sept. 18, 1937    2 Sheets-Sheet 1

INVENTOR.
GEORGE H. HUNT
BY
Carroll R. Taber
ATTORNEY.

Patented June 27, 1939

2,163,686

UNITED STATES PATENT OFFICE 2,163,686

BRAKE BOOSTER

George H. Hunt, Lansing, Mich., assignor to Motor Wheel Corporation, Lansing, Mich., a corporation of Michigan Application September 18, 1937, Serial No. 164,481

10 Claims. (Cl. 60—54.6)

This invention relates to hydraulic braking systems for vehicles, and more particularly to so-called boosters for increasing the ratio of pressure applied to the brake to pressure applied to the brake pedal.

In a conventional hydraulic braking system a pedal actuated plunger in a master cylinder applies pressure to fluid in the master cylinder, and the pressure is transmitted by the fluid through conduits to the plungers actuating the brakes. In a system of this sort there is always a certain amount of slack caused by expansion due to pressure in the master cylinder, in the conduits, and in the wheel cylinders. Also there must be clearance between the brake shoes and brake drums when in inoperative position. This slack must be all taken up before actual braking may commence and it requires some movement of the brake pedal to do so.

The amount of allowable movement of the brake pedal in a vehicle is necessarily limited to but a few inches, yet within this range of movement the slack must be taken up and the brakes applied to stop the vehicle. Now if the brake pedal ratio is high, in order that the operator need not exert an abnormally large force to stop the vehicle, the amount of movement of the pedal necessary to take up the slack constitutes most of the aforesaid allowable pedal movement and there is but little reserve left to actuate the brakes. If on the other hand the brake pedal ratio is low so that the slack may be taken up rather quickly, then the force exerted by the operator to stop the vehicle must be very high.

The brake pedal ratio that is ordinarily used with such a system is a compromise between a desired high ratio for braking and a low ratio for slack take-up, and it is not nearly as effective as a system where, in effect, the brake pedal ratio can be varied from a low ratio for taking up the slack to a high ratio for the actual application of the brakes.

It is accordingly an object of my invention to provide an apparatus which will enable the slack in the system to be taken up with a relatively small amount of pedal movement and thereafter will raise the ratio of force applied to the brake to force applied to the pedal to enable the operator to stop the vehicle without applying an abnormally high force on the pedal.

Another object of my invention is to provide an apparatus of this type which may be economically manufactured principally from stamped metal parts, and which is rugged and is not likely to get out of order.

A still further object is to provide such a structure that may be readily incorporated in existing hydraulic braking systems.

Further objects of the invention will appear in the following description when considered in the light of the attached drawings which form a part of this specification wherein like reference numerals are used to designate the corresponding parts in the various views. In the drawings.

Figure 1:
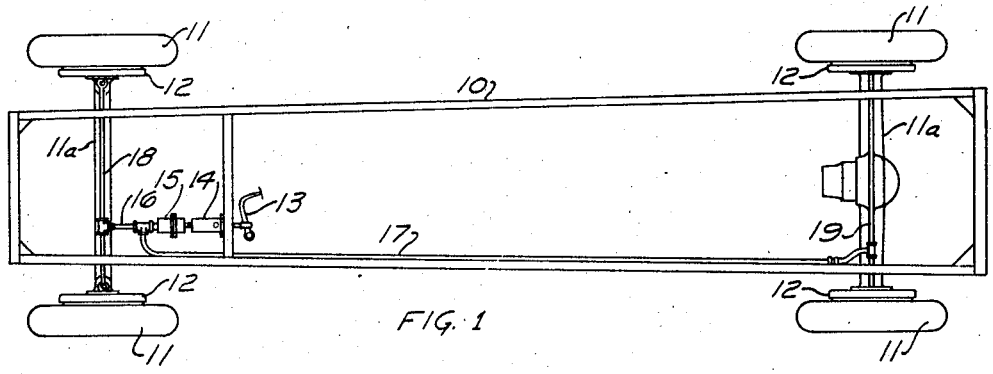
Figure 1 is a diagrammatic view of a vehicle chassis frame showing my invention applied thereto.

Referring now to the drawings, and more particularly to Figure 1, the numeral 10 designates a conventional chassis frame of a motor vehicle having wheels 11, and axles 11a supporting said frame. On each wheel 11 is a hydraulic brake 12 which may be of any conventional design. A brake pedal 13 operates a plunger in the master cylinder 14. The master cylinder is connected by a conduit to the booster 15, which in turn is connected by suitable conduits 16, 17, 18 and 19 to the various brakes. The entire system, except the space A (see Figure 2) surrounding piston 48, is filled with a suitable fluid, preferably an incompressible liquid commonly designated as brake fluid, in order that the pressure applied to the pedal 13 will be transmitted equally to all four brakes. The space A is filled with air at atmospheric or sub-atmospheric pressure.

In Figures 2, 3, 4 and 5 is shown my improved booster 15. The housing of the booster consists of two generally cup-shaped stampings 20 and 21. The stamping 20 has a radial flange 24 provided with a plurality of circumferentially spaced apertures for the reception of the bolts 22. Stamping 21 has a radial flange 25 which has a plurality of circumferentially spaced apertures corresponding to the apertures in flange 24 which also receive the bolts 22. A gasket 26 is interposed between the flanges 24 and 25, and when the bolts 22 are inserted and the nuts 23 placed thereon and drawn up snugly a fluid-tight joint between the flanges 24 and 25 is provided.

The flange 25 is provided with an aperture 25a which is tapped for the reception of a cap screw 23a to allow air trapped in the housing to be bled therefrom when the booster is filled with fluid.

The right hand or inlet end of the stamping 20 is pressed outwardly to form an open inlet neck 27 which is tapped at 28 for the reception of a threaded fitting (not shown) for connecting the housing to the master cylinder 14. The left hand or outlet end of stamping 21 is provided with an outlet neck 29 tapped at 30 for the reception of a threaded nipple (not shown) for attachment to the conduit 16.

The stamping 20 has a plurality of outwardly pressed longitudinal ribs 31 forming passages 32 for a purpose which will presently appear. As shown, there are four of these passages 32, but the number may be varied at will as changes in design may necessitate.

Within the housing is a cylindrical sleeve 33 preferably formed from a seamless tube which is expanded at the inlet end of the booster forming an annular shoulder 34 and an enlarged cylindrical portion 35. The smaller portion of the sleeve is numbered 36. The sleeve 33 is provided with apertures 37 to allow air to escape from the interior of the sleeve 33 into the housing when the booster is filled with fluid.

Figure 2:
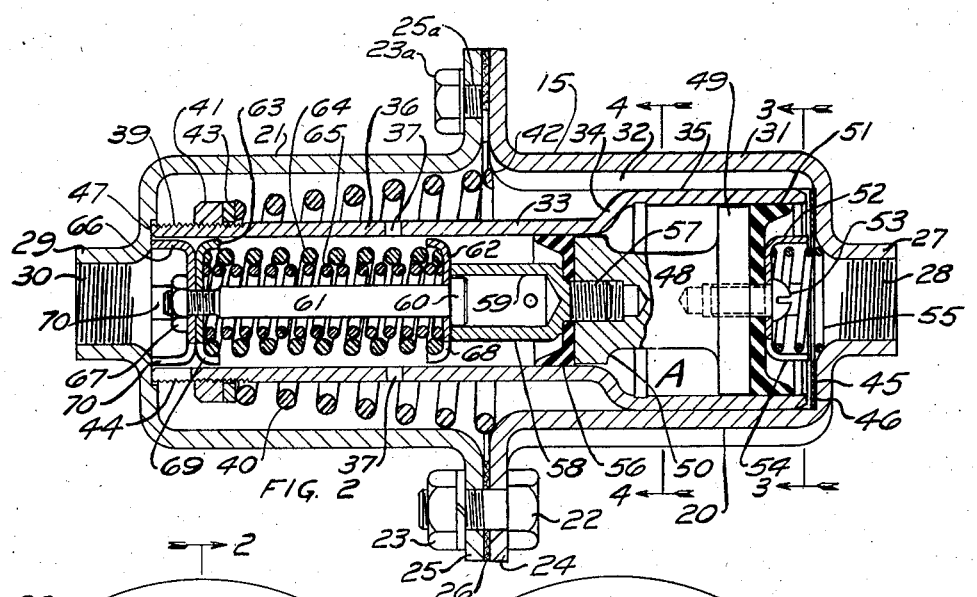
Figure 2 is a sectional view of a booster taken on substantially the line 2—2 of Figure 3.
Figures 3, 4:
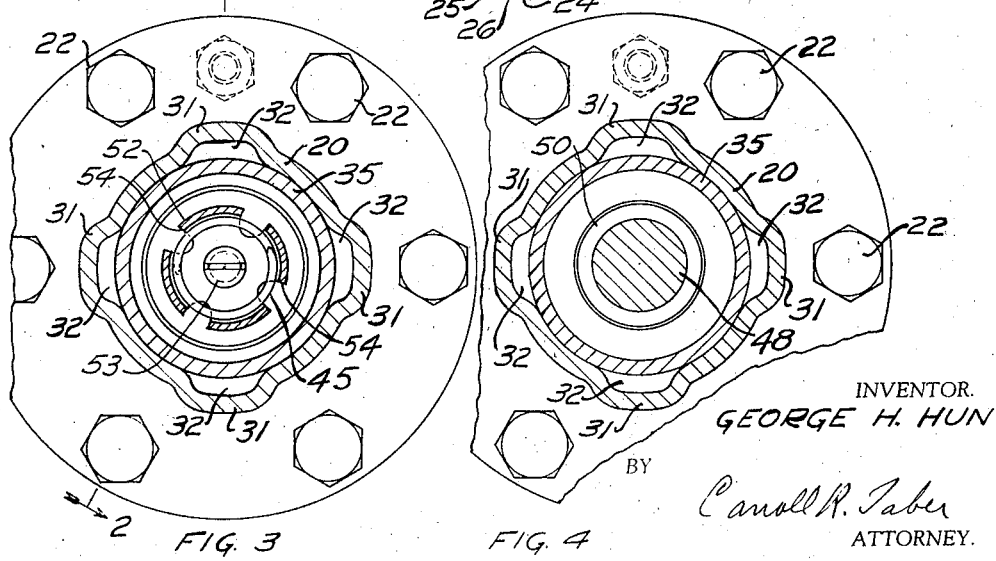
Figure 3 is a fragmentary vertical sectional view taken on substantially the line 3—3 of Figure 2.
Figure 4 is a fragmentary vertical sectional view taken on substantially the line 4—4 of Figure 2.
Figure 5:
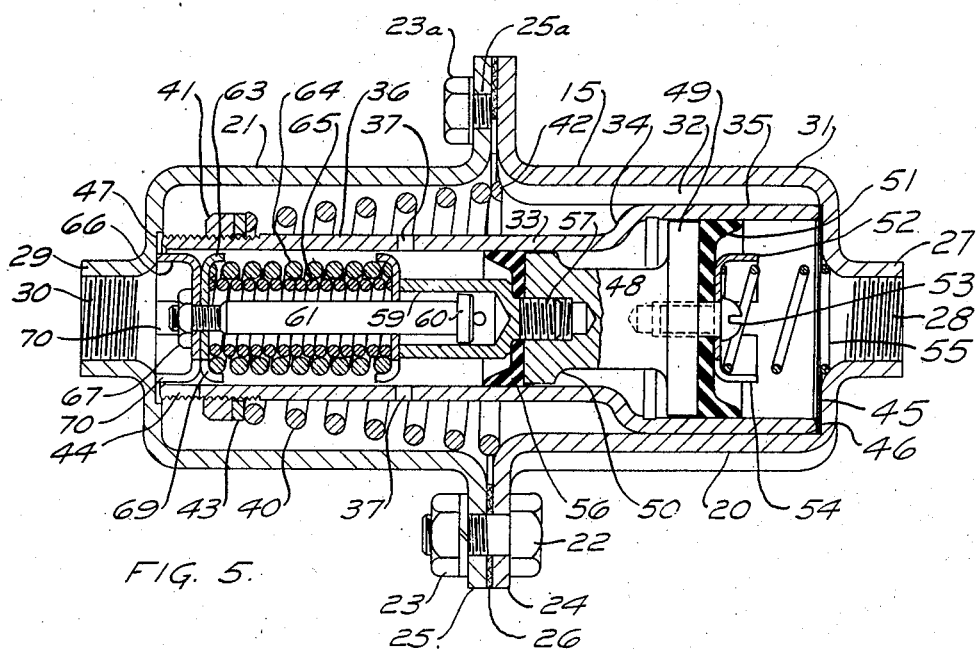
Figure 5 is a cross-sectional view of the booster similar to Figure 2 but showing the parts in full brake applying position.

A coil spring 40 surrounds the sleeve 33 and has one end seated against the shoulder 42 of stamping 20. The end of sleeve 33 is threaded at 39 for the reception of a nut 41 and a washer 43 is placed around the sleeve between the nut 41 and spring 40. When the nut is screwed on the sleeve the spring 40 is compressed so that it tends to force the sleeve 33 to the left, as seen in Figure 2, against the seat 47 in the end of stamping 21. The compression of this spring 40 may be varied by adjusting the nut on the sleeve.

The outlet end of the sleeve 33 is provided with a plurality of slots 44 at spaced points about its periphery, the reason for which will appear later.

The inlet end of stamping 20 is machined to provide a flat seat 45 on which a washer 46 of some suitable gasket material is placed. The material that is preferred is known by the trade name of "Vellumoid," but some other suitable material may be used in place thereof. This washer forms a tight seat for the end of sleeve 33 when the sleeve is forced against said washer.

The outlet end of stamping 21 may be machined to provide a seat 47 for the corresponding end of sleeve 33, but such an additional machining operation is not essential as the sleeve need not seat tightly thereon. Of course it must contact the seat as a stop.

Within the sleeve 33 is a differential piston 48 which has a large head 49, slightly smaller than the enlarged portion 35 of the sleeve, and a small head 50 of slightly smaller diameter than the smaller portion 36 of the sleeve 33. The sizes of the heads of the pistons must be such that the piston will move freely in the sleeve, and the area of the head 49 is approximately two and one-quarter times that of head 50.

Secured to the outer face of the large head 49 of the piston is a cup washer 51, preferably made of rubber, which prevents fluid from leaking past the head of the piston. A cup shaped metal spring retainer 52 held in place by screw 53 is used to secure the cup washer 51 in position on the piston head 49. The aforementioned spring retainer 52 has a plurality of notches or slots 54 in its side walls, the purpose of which will appear later.

A coiled spring 55 is inserted in retainer 52 and seats between the bottom of the retainer and end wall of stamping 20. The spring 55 is compressed when placed in the booster whereby it tends always to force the piston 48 to the left, as shown in Figure 2, or toward the outlet end of the housing.

A cup washer 56 of the same material as cup washer 51 is secured to the small piston head 50 by stud 57 threaded in a hole in piston head 50. This stud has a long cylindrical head 58 that is drilled at 59 for the reception of the head 60 of a bolt 61. On the bolt 61 are two opposed spring retainers 62 and 63 between which are mounted the springs 64 and 65. Retainer 62 is slidably mounted on bolt 61 so that bolt head 60 can slide into recess 59. A metal spacer 62 is also mounted on the bolt against the retainer 63 and the various parts are held in position on the bolt 61 by a nut 67.

The springs 64 and 65 are ordinarily preloaded to a pressure of about 135 pounds, but this pressure may be changed if desired. It will be noted that two springs 64 and 65 are used, but one spring will suffice if it has the necessary characteristics of flexibility and free movement. Two springs are usually preferred because it is difficult to obtain the necessary flexibility and range of movement with one spring.

The spring retainers 62 and 63 have their side walls slotted at 68 and 69, respectively, to allow free passage of the liquid that fills the booster between the retainers and the wall of the sleeve 33. The spacer 66 is also slotted at 70 for a purpose which will presently be described.

One of the advantages of the present invention is the taking up of the slack of the brake system with the minimum amount of pedal movement. This can be accomplished in two ways, namely, by decreasing the conventional pedal ratio or by increasing the size of the master cylinder. For example, if it is desired to apply the present invention to a brake system in which the conventional pedal ratio is 8 to 1 it will be necessary to either decrease the pedal ratio to approximately 6 to 1 or replace the master cylinder with a larger master cylinder in which the displacement is greater.

After the slack has been taken up it is desired to increase the effect at the brake shoes of the force applied to the brake pedal. That is what is accomplished by the booster forming the subject matter of this invention.

Figure 2 shows the parts of the booster in their normal position with minimum pressure in the system. Assuming now that the brake pedal is depressed, the plunger in master cylinder 14 moves to the left as in Figure 1, forcing fluid into the booster 15 through inlet neck 27. As the fluid cannot pass the piston head 49 it flows between the gasket 46 and the end of sleeve 33 through the passages 32, then through the slots 44 in the sleeve 33 and through the slots 70 in the spacer 66 out of the outlet neck 29 to the brakes where it takes up the slack in the system and applies the brake shoes to the brake drums. During this initial movement of the brake pedal, the pressure in the system is increased from the minimum to approximately 100 pounds per square inch.

The area of the right end wall of sleeve 33 is considerably less than the projected area of the shoulder 34. Consequently, as the fluid pressure is equal at all points within the booster, the total force (unit pressure times area) exerted against the shoulder 34 is greater than the total force on the right end wall of sleeve 33, and the sleeve will tend to move to the right from the position shown in Figure 2 to the position illustrated in Figure 5. The spring 40, however, is preloaded to a pressure of approximately 125 pounds, and resists this tendency so that the sleeve 33 cannot move until the force on the shoulder 34 overcomes the spring pressure. Initial movement of the sleeve 33 will therefore occur when the fluid pressure in the booster has risen to about 125 pounds per square inch. The sleeve then moves to the right against gasket 46 into the position shown in Figure 5, thereby closing the passages at the end of the sleeve 33.

Continued application of the brake pedal will still further increase the pressure in the master cylinder, and as the fluid cannot flow around the outside of the sleeve after the passages 32 are closed, it tends to force the piston 48 to the left, as shown in Figure 2. This latter movement of the piston is resisted by the springs 64 and 65, which are normally preloaded to a pressure of 130 pounds, but as the pressure in the master cylinder continues to increase, the pressure of springs 64 and 65 is overcome and the piston 48 moves over to the left into the position shown in Figure 5. As the area of piston head 49 is approximately two and one-quarter times that of piston head 50, it follows that the pressure at the outlet will be two and one quarter times that of the pressure at the inlet, less the pressure necessary to overcome the pressure of springs 64 and 65. Assuming, therefore, that the pressure at the outlet of the booster is slightly more than double that at the inlet, it will be obvious that the original pedal ratio has in effect been proportionately increased. Consequently, a relatively small force on the brake pedal will suffice to apply the necessary pressure on the brakes to stop the vehicle.

When the pressure on the brake pedal is released, the pressure in the master cylinder acting against head 49 of piston 48 drops, allowing springs 64 and 65 to expand, thereby pushing spring retainer 62, stud 57 and piston 48 to the right or back to the initial position shown in Figure 2. When the spring retainer 62 reaches the head 60 of bolt 61, and is thereby prevented from further movement, the piston 48 may move still further to the right as the hollow stud 58 may move away from the head 60 of bolt 61. The movement of the piston 48 allows the pressure in the booster housing to drop to the point where the force acting on shoulder 34 of sleeve 33 becomes less than the pressure of spring 40, whereupon the spring forces the sleeve 33 to the left, opening the passages 32, allowing fluid to flow back into the master cylinder in readiness for another application of the brakes.

It will be understood, of course, that the specific device shown and described in this specification is by way of example only, and the structure is capable of many variations that will be apparent to one skilled in the art. Consequently, I desire to be limited only by the scope of the appended claims.

I claim:

1. In a hydraulic braking system including a brake and a source of fluid pressure for actuating said brake, the combination with means interposed between said brake and said source of fluid pressure for increasing the ratio of pressure at the brake to pressure at the source upon a predetermined increase of pressure at said source, said means comprising a housing, a sleeve slidable longitudinally in said housing, said sleeve having a high pressure cylinder and a low pressure cylinder therein, a differential piston having a head in each cylinder, an inlet to said low pressure cylinder from said source of pressure, an outlet from said high pressure cylinder to said brake, and a by-pass for fluid around said sleeve connecting said inlet and outlet, said sleeve being moved longitudinally of said housing to close said by-pass by the pressure created upon the outside of said sleeve upon a predetermined increase in pressure at said source.

2. In a hydraulic braking system including a brake and a source of fluid pressure for actuating said brake, the combination with means interposed between said brake and said source of pressure for increasing the ratio of pressure at the brake to pressure at the source upon a predetermined increase of pressure at said source, said means comprising a housing, a sleeve slidable longitudinally in said housing, said sleeve having a high pressure cylinder and a low pressure cylinder therein, and a generally radially extending portion forming a shoulder connecting said cylinders, a differential piston having a head in each cylinder, an inlet to said low pressure cylinder from said source of pressure, an outlet from said high pressure cylinder to said brake, and a by-pass for fluid around said sleeve connecting said inlet and outlet, said sleeve being adapted to be moved longitudinally of said housing upon a predetermined increase in pressure in said by-pass acting on said shoulder.

3. A brake booster comprising a housing having an inlet and an outlet, a sleeve in said housing, a low pressure cylinder in said sleeve communicating with said inlet, a high pressure cylinder in said sleeve communicating with said outlet, a differential piston having a head in each cylinder, a by-pass between said inlet and outlet outside of said cylinders, said sleeve being slidable longitudinally of said housing to close said by-pass.

4. A brake booster comprising a housing having an inlet and an outlet, a sleeve in said housing, a low pressure cylinder in said sleeve communicating with said inlet, a high pressure cylinder in said sleeve communicating with said outlet, a spring surrounding said sleeve and normally urging said sleeve toward the outlet end of said housing, a differential piston having a head in each cylinder, a by-pass in said housing affording communication between said inlet and outlet outside of said sleeve, said sleeve being slidable longitudinally of said housing against the pressure of said spring to close said by-pass.

5. A brake booster comprising a housing having an inlet and an outlet, a sleeve in said housing, a low pressure cylinder in said sleeve communicating with said inlet, a high pressure cylinder in said sleeve communicating with said outlet, a spring surrounding said sleeve and normally urging said sleeve toward the outlet end of said housing, a differential piston having a head in each cylinder, resilient means between said piston and the outlet end of said housing, a by-pass between said inlet and outlet outside of said sleeve, said sleeve being slidable longitudinally of said housing against the pressure of said spring to close said by-pass.

6. A brake booster comprising a generally tubular housing having an inlet and an outlet, a sleeve in said housing, a low pressure cylinder in said sleeve communicating with said inlet, a high pressure cylinder in said sleeve communicating with said outlet, a differential piston having a head in each cylinder, a plurality of longitudinally extending grooves in the side walls of said housing forming a by-pass between said housing and said sleeve communicating with said inlet and outlet, said sleeve being slidable in said housing to close said by-pass.

7. A brake booster comprising a housing consisting of two substantially cylindrical members having their adjacent ends secured together, an outlet from the remote end of one member, an inlet to the remote end of the other member, a sleeve in said housing, a low pressure cylinder in said sleeve communicating with said inlet, a high pressure cylinder in said sleeve communicating with said outlet, a differential piston having a head in each cylinder, a longitudinally extending groove in the inner wall of said housing connecting said inlet and outlet and forming a by-pass around said sleeve, said sleeve being slidable longitudinally of said housing to close said by-pass, and a spring in said housing resisting the movement of the sleeve.

8. A brake booster comprising a housing consisting of two substantially cylindrical members having radially outwardly extending flanges at their adjacent ends rigidly connected together, said members also having radially inwardly extending flanges partially closing their remote ends, an outlet from the remote end of one of said members, an inlet to the remote end of the other of said members, a sleeve in said housing, said sleeve having two substantially cylindrical portions of different outer diameters, a low pressure cylinder in the large portion of said sleeve communicating with said inlet, a high pressure cylinder in the smaller portion of said sleeve communicating with said outlet, a differential piston having a head in each cylinder, a longitudinally extending groove in the inner wall of said housing forming a by-pass around said sleeve between said inlet and outlet, said sleeve being slidable longitudinally of said housing to close said by-pass, and a spring in said housing resisting the movement of the sleeve.

9. In a hydaulic braking system including a brake and a source of fluid pressure for actuating said brake, the combination with means interposed between said brake and said source of fluid pressure for increasing the ratio of pressure at the brake to pressure at the source upon a predetermined increase of pressure at said source, said means comprising a housing, a sleeve slidable longitudinally in said housing, said sleeve having a high pressure cylinder and a low pressure cylinder therein, a differential piston having a head in each cylinder and being movable longitudinally therein under the action of fluid pressure from said source, resilient means for resisting the movement of said piston, an inlet to said low pressure cylinder from said source of pressure, an outlet from said high pressure cylinder to said brake, and a by-pass for fluid around said sleeve connecting said inlet and outlet, said sleeve being moved longitudinally of said housing to close said by-pass by the pressure created upon the outside of said sleeve upon a predetermined increase in pressure at said source, and resilient means in said housing for resisting the movement of said sleeve.

10. In a hydraulic braking system including a brake and a source of fluid pressure for actuating said brake, the combination with means interposed between said brake and said source of fluid pressure for increasing the ratio of pressure at the brake to pressure at the source upon a predetermined increase of pressure at said source, said means comprising a housing, a sleeve slidable longitudinally in said housing, said sleeve having a high pressure cylinder and a low pressure cylinder therein, a differential piston having a head in each cylinder, an inlet to said low pressure cylinder from said source of pressure, an outlet from said high pressure cylinder to said brake, and a by-pass for fluid around said sleeve connecting said inlet and outlet, said sleeve being moved longitudinally of said housing to close said by-pass by the pressure created upon the outside of said sleeve upon a predetermined increase in pressure at said source, and resilient means in said housing for resisting the movement of said sleeve.

GEORGE H. HUNT.